United States Patent [19]

Sandiford et al.

[11] Patent Number: 4,796,700

[45] Date of Patent: Jan. 10, 1989

[54] PROCESS FOR RETARDING FLUID FLOW

[75] Inventors: Burton B. Sandiford, Balboa Island, Calif.; Roger C. Zillmer, Bloomington, Minn.

[73] Assignee: Cities Service Oil and Gas Corporation, Tulsa, Okla.

[21] Appl. No.: 822,156

[22] Filed: Jan. 24, 1986

Related U.S. Application Data

[63] Continuation-in-part of Ser. No. 624,111, Jun. 25, 1984, abandoned.

[51] Int. Cl.$^4$ .................... E21B 43/12; C08J 3/24
[52] U.S. Cl. ..................... 166/270; 525/61; 523/130; 166/295; 166/300; 252/8.512; 252/8.554
[58] Field of Search ............ 252/8.55 R, 8.55 C, 252/8.5 LC, 8.512, 8.514, 8.554; 166/295, 270, 300; 523/130; 525/61, 383; 524/503

[56] References Cited

U.S. PATENT DOCUMENTS

| | | | |
|---|---|---|---|
| Re. 30,767 | 10/1984 | Felber et al. | 166/261 |
| Re. 31,748 | 11/1984 | Block | 252/8.5 A |
| 2,720,501 | 10/1955 | Van Ness | 260/73 |
| 2,832,414 | 4/1958 | Battle | 252/8.55 R |
| 2,864,448 | 12/1958 | Bond et al. | 252/8.55 R |
| 3,079,337 | 2/1963 | Turbak et al. | 252/8.55 R |
| 3,080,207 | 3/1963 | Tanabe | 8/115.5 |
| 3,251,795 | 5/1966 | Fukushima et al. | 260/29.6 |
| 3,265,536 | 8/1966 | Miller et al. | 252/8.55 R |
| 3,265,657 | 8/1966 | Sinclair | 252/8.55 R |
| 3,396,790 | 8/1968 | Eaton | 252/8.55 LC |
| 3,421,584 | 1/1969 | Eilers et al. | 252/8.55 R |
| 3,452,817 | 7/1969 | Fallgatter | 166/305 R |
| 3,554,287 | 1/1971 | Eilers et al. | 166/295 |
| 3,640,734 | 2/1972 | Oppenheimer et al. | 99/176 |
| 3,658,745 | 4/1972 | Merrill et al. | 252/8.55 R |
| 3,663,470 | 5/1972 | Nishimura et al. | 260/2.5 F |
| 3,741,307 | 3/1971 | Sandiford et al. | 166/273 |
| 3,749,172 | 7/1973 | Hessert et al. | 166/274 |
| 3,757,863 | 9/1973 | Clampitt et al. | 166/270 X |
| 3,762,476 | 10/1973 | Gall | 166/294 |
| 3,785,437 | 1/1974 | Clampitt et al. | 166/281 |
| 3,794,115 | 2/1974 | Skagerberg | 166/294 |

(List continued on next page.)

FOREIGN PATENT DOCUMENTS

| | | | |
|---|---|---|---|
| 950355 | 7/1974 | Canada | 252/8.55 R |
| 356408 | 9/1931 | United Kingdom | 252/8.55 R |
| 2073228 | 10/1981 | United Kingdom | 252/8.55 R |
| 2074636A | 11/1981 | United Kingdom | 252/8.55 R |

OTHER PUBLICATIONS

Journal of Colloid & Interface Science, vol. 90, No. 1, Nov. 1982, pp. 34-43.
Journal of the Electrochemical Society, vol. 130, No. 2, Feb. 1983, pp. 255-259.
U.S. Government Doc. N81-29531, (NASA Case No. LEN-13, 102-1).
Billmeyer, Jr., Textbook of Polymer Sci., (2nd ed.), Wiley-Interscience, N.Y., N.Y., (1962), pp. 65-66, 78.
Nakajima, "Fractionation of Linear Polyethylene with Gel Permeation Chromatography", in Adv. in Chem. Series 125, ACS, Wash. D.C., (1973), pp. 98-107.

*Primary Examiner*—Joseph L. Schofer
*Assistant Examiner*—F. M. Teskin
*Attorney, Agent, or Firm*—F. Eugene Logan

[57] ABSTRACT

A gel-forming composition is provided comprising a first substance selected from the group consisting of a polyvinyl alcohol, a polyvinyl alcohol copolymer, and mixtures thereof, glutaraldehyde, and water, and which does not require a separately provided acidic catalyst to crosslink and form a gel. The gel-forming composition is useful for retarding the flow of fluids in subterranean formations. For example, a method is provided for retarding the flow of water in high permeability chanels in an oil reservoir. Such method is particularly useful in waterflood operations to increase the sweep efficiency of the oil recovery process. Since these gels have very good stability at elevated temperature they can be used in reservoirs having an average in situ temperature of 80° C. or higher.

37 Claims, 5 Drawing Sheets

U.S. PATENT DOCUMENTS

| | | | |
|---|---|---|---|
| 3,795,276 | 3/1974 | Eilers et al. | 166/295 |
| 3,859,269 | 1/1975 | Maurer | 252/8.55 LC |
| 3,875,074 | 4/1975 | Vassiliades et al. | 252/316 |
| 3,912,529 | 2/1985 | Kotani et al. | 106/187 |
| 3,926,918 | 12/1975 | Shibata et al. | 260/73 L |
| 3,941,730 | 3/1976 | Solenberger | 524/503 |
| 4,015,995 | 4/1977 | Hess | 166/295 X |
| 4,018,286 | 4/1977 | Gall et al. | 166/295 |
| 4,039,029 | 8/1977 | Gall | 166/294 |
| 4,040,258 | 8/1977 | Argabright et al. | 166/295 X |
| 4,098,337 | 7/1976 | Argabright et al. | 166/270 |
| 4,154,912 | 5/1979 | Phillips et al. | 252/8.55 R |
| 4,262,067 | 4/1981 | Phillips et al. | 252/8.55 R |
| 4,272,470 | 6/1981 | Hsu et al. | 252/8.55 R |
| 4,336,145 | 6/1982 | Briscoe | 252/8.55 R |
| 4,349,443 | 9/1982 | Block | 252/8.5 A |
| 4,353,804 | 10/1982 | Green et al. | 252/8.5 A |
| 4,376,183 | 3/1983 | Haskell | 524/417 |
| 4,385,155 | 5/1983 | Michaels | 525/61 |
| 4,389,319 | 6/1983 | Block et al. | 252/8.5 A |
| 4,411,800 | 10/1983 | Green et al. | 252/8.5 A |
| 4,424,302 | 1/1984 | Block et al. | 252/8.5 A |
| 4,428,845 | 1/1984 | Block | 525/58 |
| 4,447,341 | 5/1984 | Block | 252/8.5 A |
| 4,472,552 | 9/1984 | Blouin | 525/61 |
| 4,473,480 | 9/1984 | Green et al. | 252/8.5 A |
| 4,485,875 | 12/1984 | Falk | 166/295 |
| 4,486,318 | 12/1984 | Green et al. | 252/8.5 A |
| 4,498,540 | 2/1985 | Marrocco | 166/295 |

PROCESS FOR RETARDING FLUID FLOW

RELATED APPLICATIONS

This application is a continuation-in-part application of Ser. No. 624,111 filed June 25, 1984, now abandoned, which is incorporated herein by reference. The subject matter of this application is related to that of commonly assigned U.S. patent application Ser. No. 4,498,540, filed July 18, 1983 for "Gel for Retarding Water Flow" which is hereby incorporated herein by reference.

TECHNICAL FIELD

This invention relates to gels, methods of forming gels, and uses for gels. A polyvinyl alcohol based-aldehyde hydrogel, or gel, is provided which is useful for immobilizing large volumes of earth or water. The gel can be used for reducing the permeability of soils and subterranean formations to the flow of fluids, waters or brines. The gels of this invention are particularly valuable in retarding the flow of fluids, waters or brines in hydrocarbon production from a wellbore, or from solar ponds.

BACKGROUND OF THE INVENTION

The recovery of hydrocarbons, both liquid and gaseous, from subterranean zones has frequently resulted in the simultaneous production of large quantities of water or brines. In some cases, even though substantial flows of hydrocarbons have been shown, water production is so great and water disposal costs so high, that hydrocarbon production is not economical. Such water production has in some cases been disposed of in an abandoned or dry well by separating such water from the hydrocarbons and reinjecting the separated water into such wells. Where a disposal well is not available nor near the producing well, pipelining the water product over a long distance to a disposal site can become so costly that it renders the well noncommercial. Even if a disposal well is close by, the disposal cost can still be very expensive. Therefore it is desirable to find a way to reduce or shut off the flow of water while permitting hydrocarbon production to continue.

It is well known that the production of large amounts of water from hydrocarbon producing wells is a major expense item in the overall hydrocarbon recovery cost. It is not uncommon for an oil well to produce an effluent which is 60–99% by volume water and only 1–40% by volume oil. In such situations, the major part of the pumping energy is expended in lifting water from the well, a cost which the producer would like to avoid if possible. The effluent must then be subjected to a costly separation procedure to recovery water-free hydrocarbons. The foul water separated therefrom also presents a troublesome and expensive disposal problem. Consequently, it is desirable to decrease the volume of water produced from hydrocarbon wells. It is, of course, desirable to be able to achieve this objective and at the same time not materially affect the hydrocarbon recovery rate. However, where the volume of water is very high, e.g., 80 to 99% water, and only 1–20% oil, even substantial reduction in hydrocarbon production can be tolerated if water production can be substantially reduced.

One such method of reducing the flow of water has been described in U.S. Pat. No. 3,762,476 wherein a first aqueous polymer solution selected from the group consisting of polyacrylamide, a partially hydrolyzed polyacrylamide, a polysaccharide, a carboxymethylcellulose, a polyvinyl alcohol, and polystyrene sulfonate, is injected into a subterranean formation. Thereafter, a complexing ionic solution of multivalent cations and retarding anions, and which also comprises aluminum citrate, is injected into the subterranean formation. The multivalent cations are selected from the group consisting of Fe(II), Fe(III), Al(III), Ti(IV), Zn(II), Sn(IV), Ca(II), Mg(II), Cr(III), and the retarding anions are selected from the group consisting of acetate, nitrilotriacetate, tartrate, citrate, phosphate. Brine is then injected followed by a second slug of an aqueous polymer solution which can be the same or different from the first aqueous polymer solution. In any event, the complexing ionic solution of multivalent cations and retarding anions is capable of gelling both the first and second aqueous polymer solution.

Water produced from a wellbore can come from the infiltration of naturally occuring subterranean water as described above, or the water can come from injected water put into the formation in those hydrocarbon recovery processes which utilize waterflooding. U.S. Pat. No. 4,098,337 discloses a method for forming a hydroxmethylated polyacrylamide gel, in situ, to reduce the permeability of a thusly treated zone where the waterflood method of oil recovery is employed. In this case the gel was formed in situ by the injection of an aqueous polyacrylamide solution and an aqueous formaldehyde solution.

In waterflood operations it can be desirable to treat the water injector wells with a polymer gel forming solution to control and/or redirect the water flow profile. Such treatment can prevent channeling of water at the injector well and/or control or redirect the water flow through regions of varying permeability.

Although polyacrylamide-based gels can be effective in retarding water production or flow in some subterranean formations, polyacrylamide-based gels will not be stable or effective in all formations. In general, polyacrylamide-based gels will work satisfactorily in formations having a temperature below about 65° C. Above about 65° C., polyacrylamide-based gels become very sensitive to hardness of the brines, especially where hardness is above about 1000 ppm. The hardness of the water becomes a more detrimental factor the higher the temperature, thus for very hot regions even low hardness levels can render many gels ineffective. Formations which have a higher temperature, hardness, or total dissolved solids content above the aforementioned ranges usually are not capable of being successfully treated with polyacrylamide-based polymers to retard the flow of water.

In many hydrocarbon producing wells temperatures of 80° C. or higher are often encountered. Formation waters frequently have hardnesses which exceed 1000 ppm. It is therefore desirable to develop a gel which can be used to retard or block the flow of water in subterranean formations having a temperature of 65° C. or higher, and a water hardness of 1000 ppm or higher.

In other flooding operations, rather than water, other fluids can be used. Some fluids which are used are carbon dioxide and steam. Because of the high temperature required in steam flooding or other steam stimulation methods, many of the gels used for blocking water are not suitable or satisfactory for blocking steam. Other steam treating methods such as "Push and Pull" operations, sometimes referred to as "cyclic steam injection"

or "Huff and Puff" operations, where a production well is steamed for several days and then produced for a month or so result in steam channels being formed which if not blocked will result in an inefficient steaming operation due to loss of steam into channels which drain into nonproductive parts of the reservoir. Again because many of the existing gels degrade rapidly at steam temperatures, polymers such as polyacrylamides are generally not satisfactory. Other fluids such as carbon dioxide can also be used in push and pull operations.

Flooding operations using carbon dioxide and other gases as the drive fluid frequently experience a loss of drive fluid to nonproductive parts of the reservoir because of greater ability of gases to dissipate into such channel as opposed to liquids. Loss of drive gases in flooding operations and steam in stimulation methods is more difficult to prevent because the flow channels responsible for such losses can be very small in diameter or width thereby making it very difficult to fill such channels with a blocking agent. Some viscous plugging substances, even though they may have the desired stability at higher temperatures, are not able to penetrate and effectively fill narrow channels, particularly as such channels become more distant from the wellbore.

Thus there is a need for plugging fluids which can be formulated to penetrate deeply into the formation. The use of this invention addresses this problem and provides polyvinyl alcohol based gels which can be tailor made to the particular problem at hand and which can overcome many of the shortcomings of prior art plugging agents and gels.

Polyvinyl alcohol gels have been used to protect well casings from corrosion. U.S. Pat. No. 2,832,414 discloses such a method wherein an aqueous solution of a water soluble polyvinyl alcohol which is capable of forming a gel if maintained in a quiescent state, is pumped into the annular space between the casing and the wall of the bore hole. After allowing the polymer to remain quiescent over a period of time a gel is formed. The thusly formed gel prevents the intrusion of formation water into the annular space thereby reducing corrosion of the metal casing. Apparently, no crosslinking agent is employed and for that reason is not believed that this particular gel would be useful for plugging channels or fractures on a permanent bases. Furthermore, in U.S. Pat. No. 2,832,414 the gel is used to fill a relatively large but stagnant cavity compared to the volume of a typical channel in a subterranean formation associated with hydrocarbon production from a wellbore.

Studies of the macroscopic changes in polyvinyl acetate gels that occur upon removal from swelling equilibrium with isopropyl alcohol were reported in the Journal of Colloid and Interface Science, Vol. 90, No. 1, November 1982, pages 34 to 43. These studies were conducted using films of gels having various degrees of crosslinking and polymer concentration. The polyvinyl acetate gels were formed from precursor polyvinyl alcohol gels that were crosslinked with glutaric dialdehyde which were then converted to acetate gels by polymer homologous acetylation.

U.S. Pat. No. 3,265,657 discloses a process for preparing an aqueous polyvinyl alcohol composition, which remains fluid for at least a few seconds after preparation and spontaneously gels thereafter. The gel is formed by contacting a gelable fluid aqueous polyvinyl alcohol solution with a hexavalent chromium compound and a reductive agent to convert Cr(VI) to Cr(III). The compositions are used to produce foams suitable as insulating, acoustical, and packaging materials. The gels are crosslinked with chromium, not an aldehyde.

U.S. Pat. No. 3,658,745 discloses a hydrogel which is capable of significant expansion upon cooling in water and reversible shrinking upon heating which comprises a crosslinked acetalated hydrogel formed by reacting a polyvinyl alcohol previously dissolved in water and a monaldehyde and a dialdehyde. The hydrogels are alleged to have sufficient crosslinking to prevent imbibition of micromolecular materials such as low molecular weight water solutes. These hydrogels are alleged to be useful for dialytic purification when pure water is added to the macromolecular solution after each cycle. Apparently these particular hydrogels are able to absorb and desorb water and microsolutes with alternate cooling and heating cycles. Apparently a major amount of shrinkage of these gels occurs upon slight heating such as from 12° to 37° C. which indicates that these gels would have little value for blocking water in subterranean formations, especially at temperatures of 37° C. or higher.

SUMMARY OF THE INVENTION

By the term "aldehyde" as used herein is meant a monoaldehyde, a dialdehyde, a polyaldehyde, and any of the former whether substituted or unsubstituted. Preferably the aldehyde contains two functional groups such as dialdehyde or a substituted monoaldehyde as used herein is meant to include unsaturated carbon-carbon bond as well as substitution of functional groups. Nonlimiting examples of substituted monoaldehyde are acrolein and acrolein dimethylacetal. Polyaldehydes can be used and may in some cases be more desirable, however, polyaldehydes are not as available commercially as dialdehydes and as a consequence use of polyaldehydes may not be practical.

Non-limiting examples of dialdehyde crosslinking agents are glyoxal, malonaldehyde, succinaldehyde, glutaraldehyde, adipaldehyde, terephthaldehyde. Non-limiting examples of dialdehyde derivatives are glyoxal bisulfite addition compound

Na$_2$ HC(OH)SO$_3$ CH(OH)SO$_3$, glyoxal trimeric dihydrate, malonaldehyde bisdimethylacetal, 2,5-dimethoxytetrahydrofuran, 3,4-dihydro-2-methoxy-2H-pyran, and furfural. Acetals, hemiacetals, cyclic acetals, bisulfite addition compounds, shiff's bases or other compounds which generate dialdehydes in water, either alone or in response to an additional agent such as an acid or a condition such as heat are also meant to be included in the term "aldehyde" as used and claimed herein.

Non-limiting examples of monoaldehyde with a second functional group in addition to the aldehyde group are acrolein and acrolein dimethylacetal.

Non-limiting examples of polyaldehydes are polyacrolein dimethylacetal, addition products of acrolein for example, ethylene glycol plus acrolein, and glycerol plus acrolein.

By the term "acidic catalyst" or "crosslinking catalyzing substance" as used herein is meant a substance which is a proton donor or a substance which in its environment will form or become a proton donor. All acids are operable as an acidic catalyst in the gel systems described herein, for example, Bronsted acids such as mineral and carboxylic acids, or Lewis acids. Non-limiting examples of a Lewis acid are zinc chloride ferrous chloride, stannous chloride, aluminum chloride, barium fluoride, and sulfur trioxide. Some of these chemicals hydrolyse in water to produce metal oxides or hydroxides and HCl or HF. The rate of hydrolysis of many Lewis acids is dependent on temperature and the other dissolved compounds in the solution. The rate of production of the acidic catalyst, HCl, from some of the above Lewis acids determines the rate of gel formation.

A delayed action catalyst is a substance which is not acidic in and of itself, but which generates an acidic catalyst slowly on interaction with water at the temperature of interest. For example, the rate of generation of the acid in oil well usage is usually controlled by the reservoir temperature experienced during the in-situ gel formation. In many applications the rate of acidic catalyst generation or release can be controlled by the gel-forming fluid formulation to range from a few minutes to a few days or more.

The acid catalyst can be a two component system, for example, a two component delayed action catalyst can comprise a first component which will react with a second component, to form an acidic catalyst. A non-limiting example of such a two component delayed action catalyst is sodium persulfate and a reducing agent. In such a delayed catalyst system the sodium persulfate reacts with the reducing agent to produce sulfuric acid. In another two component delayed action catalyst system the reaction product of the two components can react with water to form the acidic catalyst.

The acidic catalyst and/or delayed action catalyst must, of course, have some solubility in water. However, in some oil field usages the partial solubility of the acidic catalyst in the oil product can be advantageous if treatment is to include subterranean zones containing both oil and water. The fraction of the acidic catalyst or delayed action catalyst which dissolutes in oil will, of course, not be available to catalyze the gel formation reaction in such zones of high oil content; consequently such oil-water zones will not be blocked by gel formation to the same extent as those zones with little or no oil present.

Non-limiting examples of delayed action catalysts are methyl formate, ethyl formate, methyl acetate, ethyl acetate, glycerol monoacetate or acetin and glycerol diacetate or diacetin.

Laboratory tests conducted on core samples have shown that diacetin hydrolysis more slowly than methyl formate at all temperatures including the higher temperatures. Therefore, where subterranean formations having higher temperatures are encountered, diacetin or acetin because of their slower rate of hydrolysis are used to provide a longer time for crosslinking reactions to occur and hence provide a longer time for the gelling forming fluids to penetrate into the pores of such subterranean zones before gelation occurs. Non-limiting examples of delayed action catalyst and their acidic catalyst product are:

| Delayed Action Catalyst | Acidic Catalyst Product |
| --- | --- |
| Methyl formate | Formic acid |
| Glycerol diacetate | Acetic acid |
| Sodium persulfate | Sulfuric acid |
| Sodium dodecyl sulfate | Sulfuric acid |
| Methyl methane sulfonate | Methylsulfonic acid |
| Sodium triiodide/sodium bisulfate/water | Hydroiodic acid |

Therefore, delayed action acidic catalysts can be esters which slowly hydrolyze in water, the rate of hydrolysis being dependent on temperature and initial pH. Other delayed action catalysts are the analogs of esters and acids such as sulfones, xanthates, xanthic acids, thiocyanates, and the like. In some of these examples, hydrolysis produces an acidic catalyst which speeds the crosslinking reaction and an alcohol which does not affect gel formation. An example of a delayed action acidic catalyst is methyl formate which is influenced by the environment with respect to the rate of formation of acid. For example, the higher the temperature, the faster methyl formate will hydrolyze and generate formic acid.

By the term "Bronsted acid" as used herein is meant a chemical which can act as a source of protons. By the term "Lewis acid" as used herein is meant a chemical that can accept an electron pair from a base. By the term "delayed action acid" as used herein in meant any acidic catalyst which makes available or generates donor proton over a period of time or after an initial period of time either as a consequence of its characteristic or the characteristics of the environment in which it is used.

By the term "gel" as used herein is meant a chemically crosslinked three-dimensional elastic network of long-chain molecules with a certain amount of immobilized solvent (diluent) molecules.

By the term "PVA based substance" or "PVA" (frequently referred to herein as the "first substance") is meant long-chain molecules selected from the group consisting of polyvinyl alcohols, polyvinyl alcohol copolymers, and mixtures thereof.

By the term "PVA-aldehyde gel" as used herein is meant a chemically crosslinked three-dimensional elastic network of long-chain molecules selected from the group consisting of a polyvinyl alcohol, a polyvinyl alcohol copolymer, and mixtures thereof, crosslinked with an aldehyde, and containing a certain amount of immobilized and chemically bound water molecules.

By the term "PVA-glutaraldehyde gels" as used herein is meant a chemically three-dimensional elastic network of various PVA based substances crosslinked with glutaraldehyde, and containing a certain amount of immobilized and chemically bound water molecules.

By the term "water" as used herein, unless otherwise specified, is meant to include any source of water, including brine, sea water, brackish water, formation water, fresh water and pure water which is $H_2O$. Furthermore if the water is a brine, the brine can be saturated at an elevated temperature. By the term "aqueous" as used herein, unless otherwise specified, is meant to include aqueous solutions comprising such water. Thus, for example, an aqueous solution of the first substance is to be understood to include the first substance dissolved in brine or fresh water.

All of the above mentioned acidic catalysts are effective crosslinking catalyzing substances for PVA-aldehyde and PVA-glutaraldehyde gel systems.

Non-limiting examples of polyvinyl alcohol copolymers are polyvinyl alcohol-co-crotonic acid, polyvinyl alcohol-co-acrylic acid, polyvinyl alcohol-co-methacrylic acid, polyvinyl alcohol-co-vinylpyridine, and polyvinyl alcohol-co-vinylacetate, the latter of which is frequently present in small amounts in commercial grade polyvinyl alcohols.

In reservoirs having a highly alkaline brine, such as those with a high clay content, it is not possible to form a gel from a composition which requires a highly acidic pH condition; for example, a pH of 5 or lower, for crosslinking. In such highly alkaline reservoirs continual alkaline brine infusion into the gel-forming composition simply prevents the composition from maintaining a low pH. It therefore is desirable to have a gel-forming composition which can be gelled within useful gel times in alkaline reservoirs and with alkaline brines. There is even a greater need for such gel-forming compositions which produce stable gels for long periods of time at elevated temperatures.

We have discovered that improved gels can be produced which are stable and effective in alkaline reservoirs which are at elevated temperatures by using a high concentration of glutaraldehyde as the crosslinking agent for forming the gel. These gels have an advantage in that our gels can be formed from gel-forming compositions under weakly acidic conditions. This characteristic of our gel-forming compositions permit them to be used in reservoirs which contain substantial amounts of alkaline materials, including carbonates. We have found that by using a high concentration of glutaraldehyde, the pH of the gel-forming composition can be maintained from greater than about 5, preferably from about 5.5, to less than 7, and a stable gel can still be produced at elevated temperatures. We have discovered, that in mildly alkaline reservoirs, that by using a relatively high concentration of glutaraldehyde that a separately provided acidic catalyst or crosslinking catalyzing substance is not required. This discovery therefore offers another very distinct advantage over other PVA aldehyde gel systems in that it permits our gel-forming composition to penetrate in-depth, i.e., to relatively greater distances from the wellbore before the gel sets than would be possible in gel systems which must be promoted under more strongly acidic conditions. We have discovered that the higher glutaraldehyde concentration somehow continuously produces and maintains a slightly or weakly acidic condition as the gel-forming composition begins to set. This phenomena permits our gel-forming composition to penetrate greater distances into the formation thereby enabling our gels to block the flow of fluids in subterranean formations for longer periods of time after treatment. Accordingly, there is provided a process for retarding the flow of fluid in a subterranean formation comprising introducing an effective amount of a gel-forming composition into a subterranean formation, the gel-forming composition being operable when gelled in the formation for retarding the flow of fluid therein, the gel-forming composition comprising (i.) an aqueous solution comprising a PVA based substance or first substance selected from the group consisting of polyvinyl alcohols, polyvinyl alcohol copolymers, and mixtures thereof, and (ii.) an effective amount of glutaraldehyde which is operable for promoting crosslinking of the first substance and glutaraldehyde under weakly acidic conditions; and allowing the gel-forming composition to form a gel in the subterranean formation which is effective for retarding the flow of fluid therein. In a further embodiment the weakly acidic condition is such that the pH of the gel-forming composition is greater than about 5 but less than 7, preferably from about 5.5 to about 6.9, and especially preferably from about 6 to about 6.8. A further embodiment wherein the subterranean formation has a reservoir brine having a pH higher than 7, further comprises the steps of recovering a predetermined amount of the reservoir brine and adjusting the pH thereof to a value from greater than about 5 to less than 7, preferably from about 5.5 to about 6.9, and especially preferably from about 6 to about 6.8, to form an adjusted brine, and using the thusly adjusted pH brine as a solvent for the PVA based substance thereby forming the aqueous solution. In one embodiment, other than glutaraldehyde and acidic products produced in said gel-forming composition from the glutaraldehyde, the gel-forming composition is substantially free of effective amounts of crosslinking catalyzing substances which are operable for promoting a crosslinking reaction between the first substance and glutaraldehyde; and wherein the gel is formed in the subterranean formation without contacting the gel-forming composition with any additional effective amounts of a crosslinking catalyzing substance; i.e. the gel-forming composition while gelling in the subterranean formation is free of crosslinking catalyzing substances except for such substances produced from the glutaraldehyde itself.

In another embodiment the amount of glutaraldehyde is operable for causing the gel-forming composition to gel in the subterranean formation in a period of time no greater than about 5 days, and preferably from about one half to about four days after formulating or introducing the gel-forming composition into the subterranean formation. In a further embodiment the amount of glutaraldehyde is such that the gelling time after formulating or introducing into the subterranean formation is from about one to about two or three days.

In one embodiment the amount of glutaraldehyde is at least about 0.15 weight percent of the gel-forming composition or gel. In another embodiment the amount of glutaraldehyde is from about 0.15 to about 4, preferably from about 0.2 to about 3, and especially preferably from about 0.5 to about 2 weight percent of the gel-forming composition or gel. In still another embodiment the amount of glutaraldehyde is more than about 8 percent of the stoichiometric amount to react with all the crosslinkable sites of the first substance. In one embodiment the total aldehyde content of the gel-forming composition is from about 0.15 to about 4% of the weight of the gel-forming composition or thusly formed gel.

In still another embodiment the amount of the glutaraldehyde is sufficient to maintain the pH of the gel-forming composition acidic and at least greater than about 5.0. In one embodiment the effective amount of glutaraldehyde is operable to maintain the pH of the gel-forming composition from about 5.5 to less than 7, and preferably from about 6 to about 6.8 or 6.9. A pH range from about 5.5 to about 6.5 is also useful for greater in-depth treatment as well as the above described pH ranges. In one embodiment of the present invention there is provided a process for retarding the flow of fluid in a subterranean formation, comprising:

(a) introducing an effective amount of a gel-forming composition into a subterranean formation, the gel-forming composition being operable when gelled in the formation for retarding the flow of fluid therein, the gel-forming composition comprising (i.) an effective amount of a first substance dissolved in water to form an aqueous solution, the first substance being selected from the group consisting of polyvinyl alcohols, polyvinyl alcohol copolymers, and mixtures thereof, wherein the gel-forming composition contains an amount of the first substance of from about 0.5 or 1 to about 5 weight percent of the gel-forming composition or gel, and (ii.) an effective amount of glutaraldehyde which is operable, for forming a weakly acidic condition having a pH from about 5.5 to less than 7, or preferably from about 6 to about 6.8 or 6.9, in the gel-forming composition and also operable for promoting crosslinking of the first substance and glutaraldehyde and for forming, in combination with the effective amount of the first substance, a gel from the gel-forming composition under said weakly acidic condition within a period of time no greater than about 5 days, preferably from about ½ to 3 or 4 days, without adding an acidic catalyst to the gel-forming composition to lower the pH of the gel-forming composition below about 5 or 5.5, or preferably below about 6, wherein, other than glutaraldehyde and acidic products produced in the gel-forming composition from the glutaraldehyde, the gel-forming composition is substantially free of effective amounts of crosslinking catalyzing substances which are operable for promoting substantial acidic catalysis of a crosslinking reaction which is sufficient to form a gel within the period of time mentioned this step (a) (ii.) in a second gel-forming composition containing the effective amount of said first substance and a lesser amount of glutaraldehyde, wherein such lesser amount of glutaraldehyde is A. smaller amount of glutaraldehyde than said effective amount of glutaraldehyde referred to this step (a) (ii.).

B. inoperable for forming a gel within the same period of time referred to this step (a) (ii.) from such second gel-forming composition containing the same effective amount of first substance referred to in step (a) (i.) above and such lesser amount of glutaraldehyde under the same weakly acidic condition referred to this step (a) (ii.) in which a gel is formed when using the same effective amount of glutaraldehyde under the same weakly acidic condition referred to in step (a) (i.) above, and C. operable for forming a gel within the same period of time referred to this step (a) (ii.) from such second gel-forming composition containing the same effective amount of the first substance referred to in step (a) (i.) above and such lesser amount of glutaraldehyde which also contains an added acidic catalyst which causes the gel-forming composition to have a pH of 5 or less, or 5.5 or less, or preferably 6 or less, and further wherein the effective amount of glutaraldehyde referred to this step (a) (ii.) is also from about 0.15 to about 4 weight percent of said gel-forming composition or gel; and (b) allowing said gel-forming composition to form a gel in said subterranean formation which is effective for retarding the flow of fluid therein.

In one embodiment the gel-forming composition or gel is at least about 64 weight percent water, i.e. pure water or $H_2O$. In one embodiment, the gel-forming composition is at least about 91 weight percent water (in the generic sense) or brine. The brine can be just barely brackish or saturated with dissolved salt and hot or near its boiling point. Some hot saturated brines near their boiling points can contain as much as about 30% by weight dissolved salt or as little as about 70% by weight $H_2O$. Exact amounts of dissolved salt will vary depending on the various species of salts involved and the extent of any supersaturation. For example a gel-forming composition which is 91% by weight brine, wherein the brine is saturated and has a $H_2O$ content of 70% by weight, will be about 64% by weight $H_2O$.

In a further embodiment the process comprises preventing the introduction into the subterranean formation of an effective amount of a crosslinking catalyzing substance which is not glutaraldehyde under conditions which are operable for causing substantial contacting of the crosslinking catalyzing substance with the gel-forming composition, wherein the crosslinking catalyzing substance is operable for promoting a crosslinking reaction between the first substance and glutaraldehyde.

In still another embodiment, wherein the subterranean formation comprises a substantial amount of a basic material which when contacting the gel-forming composition will increase the pH thereof, the amount of glutaraldehyde in the gel-forming composition is sufficient to maintain the acidity of the gel-forming composition, after its introduction into the subterranean formation, at a pH of from about 5.5 to less than 7, preferably from about 6 to about 6.8 or 6.9. Another embodiment, wherein the subterranean formation also comprises substantial amounts of basic materials which can increase the pH of the gel-forming composition to a value of 7 or more, further comprises contacting the subterranean formation with an effective amount of an acidic substance sufficient to neutralize the basic materials to such an extent that when the gel-forming composition is introduced into the subterranean formation the basic materials will not be capable of increasing the pH of the gel-forming composition to 7 or higher before the gel-forming composition forms a gel in the subterranean formation.

The process is particularly useful where the subterranean formation is a hydrocarbon-producing formation. Accordingly, after forming the gel in the high permeability flow channels of the subterranean formation, a further embodiment comprises recovering oil from the formation. The process is especially useful in a secondary oil recovery operation. In one embodiment the fluid which is retarded is water and in a further embodiment oil is recovered by waterflooding.

In another embodiment the first substance has an average molecular weight of at least about 30,000 and preferably at least about 100,000. Preferably the average molecular weight of the first substance of polyvinyl alcohol is from about 100,000 to about 1,000,000. Higher molecular weights can be used; however, the higher molecular weight the higher the viscosity of an aqueous solution of the first substance or polyvinyl alcohol. Average molecular weights for the first substance over 5,000,000 will probably form too viscous a solution to be useful. In one embodiment the average molecular weight of the first substance is about 125,000. The gel-forming composition must contain an effective amount of the polymer or first substance to form a gel with the glutaraldehyde and water. An effective amount of first substance is from about 0.5 to about 5% of the weight of the gel-forming composition or gel. In a preferred embodiment the first substance is polyvinyl alcohol. The amount of the first substance is from about 0.5 or 1 to about 5 percent of the weight of the gel-forming composition or gel.

In an embodiment in which the subterranean formation also has a low permeability porous structure which is at least partly plugged with flow inhibiting deposits which are soluble in acids, such deposits retarding the flow of fluids in the subterranean formation, the process further comprises the step of introducing an acid effective for dissolving such deposits into the subterranean formation after forming the gel therein from the gel-forming composition.

There is also provided a gel-forming composition and a gel formed from a gel-forming composition comprising i. a first substance selected from the group consisting of polyvinyl alcohols, polyvinyl alcohol copolymers, and mixtures thereof, ii. an effective amount of glutaraldehyde sufficient to crosslink with said first substance and form a gel with water, and iii. an amount of water or brine, such that $H_2O$ provides at least about 64% of the weight of the gel-forming composition, and wherein such water has sufficient acidity to cause the gel-forming composition to have a pH from greater than about 5 or about 5.5 to less than 7. In a further embodiment, except for the glutaraldehyde, the gel-forming composition is substantially free of effective amounts of crosslinking catalyzing substances which are operable for promoting substantial crosslinking reaction between the first substance and glutaraldehyde.

In another embodiment the amount of glutaraldehyde is operable for causing the gel-forming composition, when maintained at a predetermined temperature, to gel in a period of time from about one half to about five days, preferably about four days and especially preferably about three days after the gel-forming composition is formed. In a further embodiment the amount of glutaraldehyde is such that the gelling time at the predetermined temperature is from about one to about two days.

In yet another embodiment, the amount of glutaraldehyde is from about 0.15 to about 4% of the weight of the gel-forming composition or gel. Preferably the effective amount of glutaraldehyde is from about 0.5 to about 2% of the weight of the gel-forming composition or gel.

In still another embodiment the water of the gel-forming composition is provided by a brine and the brine provides at least about 91 percent of the weight of the gel-forming composition. Furthermore the brine can be saturated and at or near its boiling point.

In another embodiment the first substance is polyvinyl alcohol. Preferably the first substance or polyvinyl alcohol has an average molecular weight of at least about 30,000 and provides about 1.5 to less than about 5% of the weight of the gel-forming composition. It is especially preferred that the average molecular weight of the first substance or the polyvinyl alcohol be at least about 100,000. Preferably the average molecular weight of the first substance or polyvinyl alcohol is from about 10,000 to about 1,000,000. Higher molecular weights can be used; however, the higher molecular weight the higher the viscosity of an aqueous solution of the first substance or polyvinyl alcohol. Average molecular weights for the first substance over 5,000,000 will probably form too viscous a solution to be useful. In one embodiment the average molecular weight of the first substance is about 125,000. It is also especially preferred that the first substance or polyvinyl alcohol provide about 2.5% of the weight of the gel-forming composition or gel.

Accordingly, there is no requirement that an acidic catalyst or delayed action catalyst be added to the gel-forming composition to lower the pH below about 5 or about 5.5 and preferably below about 6, or where the subterranean formation does not have substantial amounts of basic materials in the nonproductive flow channels, that the flow channel be first neutralized before introducing the gel-forming composition therein. Rather the gel-forming composition is maintained in a slightly or weakly acidic condition by the increased concentration of glutaraldehyde when the mixture is maintained at a temperature of about 65° C. or higher.

The kinetics of gel formation is also controlled by the glutaraldehyde concentration. For example, for a gel time of about 24 hours, glutaraldehyde concentrations are from about 0.15 to about 2 percent, depending on the initial pH of the brine, buffers in the brine, and basic components in the subterranean formation.

In still further embodiments of the above described gels, the water used to form the gel has a hardness of at least about 1000 ppm. In further embodiments the water has a hardness of at least about 3000 ppm, or 6000 ppm, or higher. In other further embodiments of the above described gels, the water used to form the gel has a total dissolved solids content of at least about 30,000 ppm. In a still further embodiment such water has a total dissolved solids content of at least about 80,000 ppm. If desired the water can be a hot saturated brine.

In the embodiments of this invention the glutaraldehyde crosslinks with the polyvinyl alcohol or polyvinyl alcohol copolymer through formation of acetals. It has been found that gels formed in this way are adaptable to the hardness of the water from which they are formed or exposed. These gels are also more stable at high temperatures than polyacrylamide based gels or gels made from biopolymers or polyvinyl alcohols gelled by other crosslinking agents such as borate.

Because of the adaptability and compatibility of these gels to water hardness or total dissolved solids content, these gels can be prepared using formation water, brackish water, sea water, brine or usually any other available source of water conveniently at hand as well as fresh water, i.e. $H_2O$. Because the largest ingredient used to formulate the above described gels is principally water, substantial economic advantage is provided by this invention which permits gels to be formed with the cheapest source of available water. However, the advantages of this invention are not limited merely to economic advantages because these gels also provide substantial technical advantages over other gels. For example, in many of their uses these gels are subjected to the infusion of severely contaminated water into the gelling mass prior to reaching its gelation point. Where such contaminated water infusion occurs in many other gelling fluids the gelation thereof is destroyed or so severely harmed that such other gels, if in fact they do gel, would be rendered ineffective for their intended use.

Due to their stability at elevated temperatures, the above described gels can also be formed and used in formations having an average formation or in-situ temperature of about 80' C. or higher, and in some embodiments where the average information or in-situ temperature is 125° C. or higher.

The above described methods of forming a gel in situ in subterranean formations be be practices using all of the gels provided by this invention.

The principles of this invention can be used where the subterranean water-conveying zone is under the subterranean hydrocarbon-producing formation; or where the subterranean water-conveying zone surrounds the subterranean hydrocarbon-producing formation; or where at least part of the subterranean water-conveying zone coincides with at least part of the subterranean hydrocarbon-producing formation. By water-conveying zone is meant the detrimental flow channels, or nonproductive or high permeability parts of a reservoir.

In one embodiment of this invention directed to a water flood operations, it frequently is desirable to treat the water injector wells with a polymer gel-forming solution to control the water flow profile. In this embodiment such treatment prevents channeling of water at the injector well and/or controls and/or redirects water flow through regions of varying permeability. Since in this embodiment the polymer is injected as a relatively low viscosity aqueous phase it penetrates preferentially the region of highest permeability to water. Accordingly, after formation of the gel in high permeability regions, such regions are converted to low permeability to further retard water flow thereby causing, upon further water injection, a water sweep of previously inaccessible areas in the formation which usually have relatively low permeability. By extending the water flow to such previously inaccessible regions, more hydrocarbons can be recovered than would be recovered in the absence of such polymer treatment.

The gels of this invention have improved resistance to heat and are stable in hard water. These characteristics make these gels particularly useful for many oil field applications such as water mobility control. These gels can be advantageously used in other harsh environments such as solar pond construction where they can be used to consolidate loose soil and to retard or stop the leakage of brine through the pond floor, or to prevent convective flow of hot water from lower intervals into upper intervals containing cooler water. For oil field application, no other gels are known which exhibit the stability and durability of the gels of this invention, especially in hot reservoirs having high carbonate or clay content.

Accordingly, one objective of this invention is to provide a means of controlling water movement in oil wells and subterranean formations especially in formations having temperatures 80° C. or higher, or where the waters involved are saline or hard or saturated brines.

Another object of this invention is to provide an inexpensive polymer based gel for other oil field developmental uses such as fracture fluids and fluids for secondary and tertiary oil recovery. It is another object of this invention to provide a gel which can be formulated using hard water and water containing a high level of dissolved solids such as sea water, formation water and brines encountered in deep off-shore hydrocarbon fields.

Another object of this invention is to provide a gel which is stable at high temperatures and in particular more stable than other gels at such high temperatures.

DESCRIPTION OF THE PREFERRED EMBODIMENT

Figure 1:
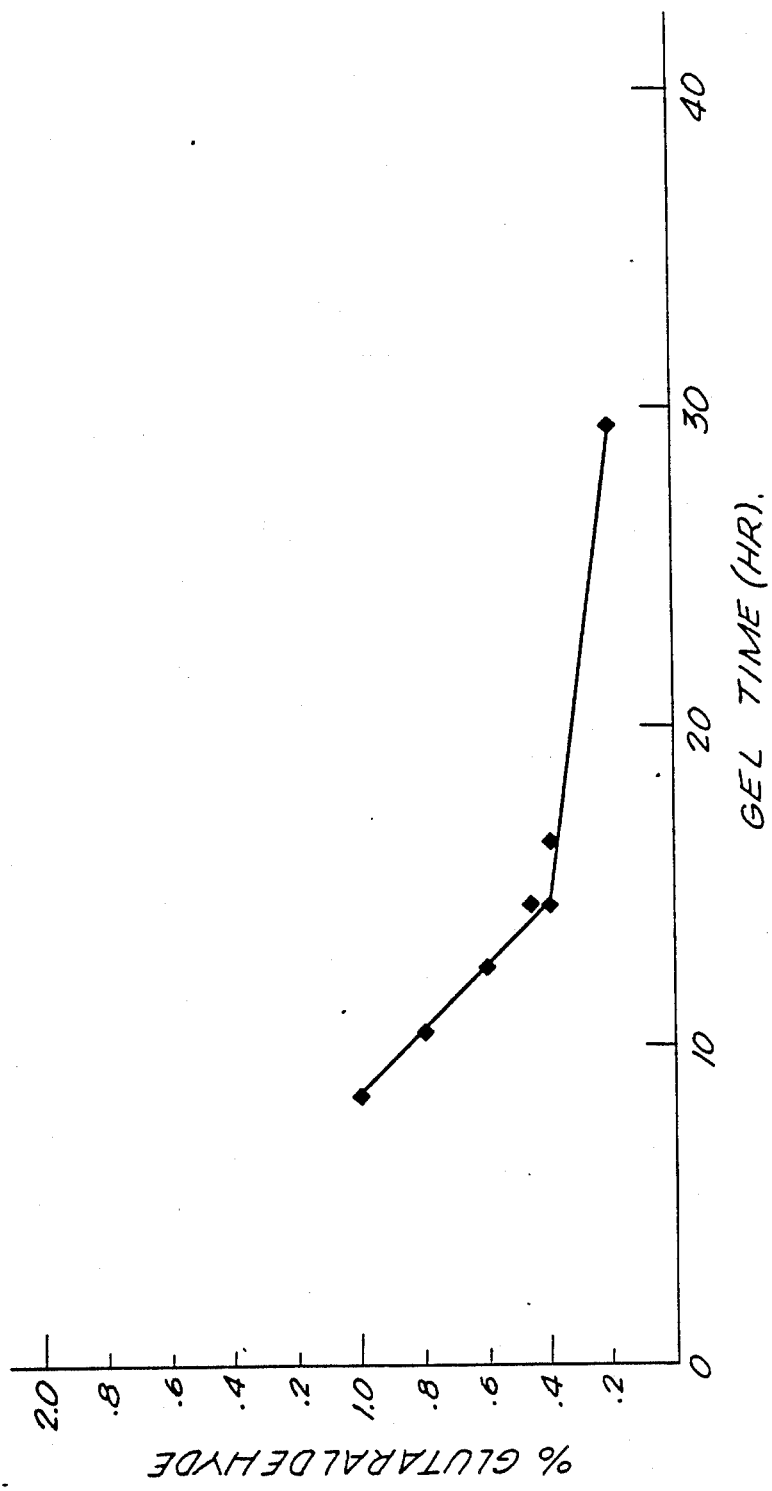
FIG. 1 is a graph of static gel times as a function of glutaraldehyde concentration in a gel-forming composition formulated with synthetic brine.

An oil well having an average formation or in-situ temperature of 80° C. or higher, and also having an undesirable amount of water production, is treated by injecting a polyvinyl alcohol-glutaraldehyde-brine mixture into the wellbore and from the wellbore into the reservoir. The mixture contains about 2.5% polyvinyl alcohol having an average molecular weight of 126,000 or higher, about 2% glutaraldehyde, and the remainder about 95.5% by weight of a brine having a total dissolved solids content of about 50,000 ppm and a hardness of about 5000 ppm. The polymer will undergo crosslinking and gel in situ in a period of time ranging between several hours to several days depending upon, in part, the average formation or in-situ temperature. The following examples demonstrate how some of the gels of this invention can be made and how such gels are effective in reducing the permeability of sandstone materials to the flow of brines.

EXAMPLE NO. 1

The following data presented in tabular format, in Table 1, demonstrates that gels can be formed from gel-forming compositions which are essentially free of an acidic catalyst or crosslinking catalyzing substance by increasing the concentration of glutaraldehyde to at least 0.15%. Gel times of 24 to 48 hours were observed. These extended gel times permit the gel-forming composition to penetrate in-depth into the reservoir thereby permitting high permeability fluid flow channels to be plugged for distance much greater than 8 meters from the wellbore. In fact, the gel time observed indicate that such fluid flow in non-productive channels can be retarded at distances 15, or 30 meters or more from the wellbore.

TABLE 1

The following tests were conducted in vials. In all tests polyvinyl alcohol concentration in the gel-forming composition was 2.5%. The average molecular weight of the polyvinyl alcohol was reported by the manufacturer to be about 126,000.

| Test No. | Glutaraldehyde Concentration (%) | Initial pH Range | Final pH Range | Gel Time (hrs.) |
|---|---|---|---|---|
| 1 | 0.2 | 7.0–7.2 | 5.3–5.5 | 24 |
| 2 | 0.15 | 7.0–7.5 | 5.3–5.5 | 29 |
| 3 (1) | 0.5 | 7.0–7.2 | 6.0–6.5 | 48 |
| 4 (1) | 1.0 | 7.0–7.2 | 6.0–6.5 | 24 |
| 5 (2) | 0.5 | 7.0–7.2 | 6.0–6.5 | 30 |

(1) Test Nos. 3 & 4 were conducted in the presence of solid calcium carbonate.
(2) Test No. 5 was conducted in the presence of crushed high clay content rock from the West Pico reservoir in Beverly Hills, California.

TABLE 1-continued (3) The gel-forming composition was formulated using a synthetic brine. The synthetic brine was prepared by adding the following amounts of salts to deionized water and adjusting the volume to one liter:

| | |
|---|---|
| NaCl | 15.0 gr. |
| $CaCl_2.2H_2O$ | 1.80 gr. |
| $MgCl_2.6H_2O$ | 0.788 gr. |
| $NaHCO_3$ | 0.297 gr. |
| KCl | 0.19 gr. |
| $BaCl_2$ | 0.06 gr. |
| $SrCl_2$ | 0.04 gr. |

The total dissolved solids content of the synthetic brine was 1.82%.

The data demonstrates that a gel can be formed from gel-forming compositions containing higher glutaraldehyde concentrations without adding an acidic catalyst. In fact, the data shows that even slightly basic mixtures are converted to slightly acidic mixtures without the addition of an acidic catalyst to the gel-forming mixture. The conversion of the composition from basic to neutral is believed to be caused by the conversion of a part of the glutaraldehyde to an acidic substance.

EXAMPLE NO. 2

A 90 centimeter (90 cm) by 2.5 cm stainless steel tube was packed with clean Wedron silica sand. The sand pack was flooded until saturated with a weakly buffered brine having a pH of 7.7. A gel-forming composition position was prepared having a concentration of 2.5% polyvinyl alcohol with an average molecular weight of 126,000, and 1.0% glutaraldehyde using the weakly buffered brine as solvent. The sand pack and flow lines leading thereto were maintained at a temperature of 93° C. in an oven. The gel-forming composition was fed into the sand pack and after 13 hours of flow through the sand pack the inlet pressure thereto increased rapidly indicating gelation. Upon disassembly of the tube the sand was found to be consolidated by the gel and had some structural strength. The results show that a PVA based substance can be crosslinked with glutaraldehyde without the addition of an acid catalyst simply by the conversion of a part of the glutaraldehyde to an acidic substance directly in the gel-forming mixture.

EXAMPLE NO. 3

A second sand pack was prepared for testing as in Example No. 2 except crushed Berea sandstone was used instead of Wedron sand. The sand pack was flooded with the same gel-forming composition and in the same manner as in Example No. 2. The gel time was found to be 30 hours.

EXAMPLE NO. 4

A third sand pack was prepared for testing as in Example No. 2 except that crushed high clay content W Pico reservoir rock was used instead of Wedron sand. The sand pack was flooded with the same gel-forming composition and in the same manner as in Example No. 2. The gel time was found to be 55 hours.

Examples Nos. 2, 3 and 4 demonstrate that the chemical nature of the sand has an influence on the gel time. Example No. 4 further demonstrates that a gel can be formed in a high clay content alkaline rock from a gel-forming composition which did not contain an acidic catalyst except for the decomposition products of glutaraldehyde, and further, wherein such decomposition products are produced in situ in the gel-forming composition directly from the glutaraldehyde.

EXAMPLE NO. 5

Example Nos. 5 to 8 were conducted at 93° C. FIG. 1 is a graph of static gel times in vials as a function of glutaraldehyde concentration in the gel-forming composition. A synthetic brine containing 1.8% NaCl and 0.2% $CaCl_2$ was used to form the gel-forming mixture. The graph demonstrates that gelation of PVA based substances-glutaraldehyde-brine mixtures occurs relatively rapidly in unbuffered brines at high temperature. By the term "unbuffered brine" as used herein is meant a brine which is relatively free of buffering agents which would resist changes in the pH of the gel-forming composition, especially changes in the pH by one or two or more. The graph further demonstrates that gel time can be decreased by increasing the concentration of glutaraldehyde in the gel-forming composition without the addition of an acidic catalyst thereto.

EXAMPLE NO. 6

Figure 2:
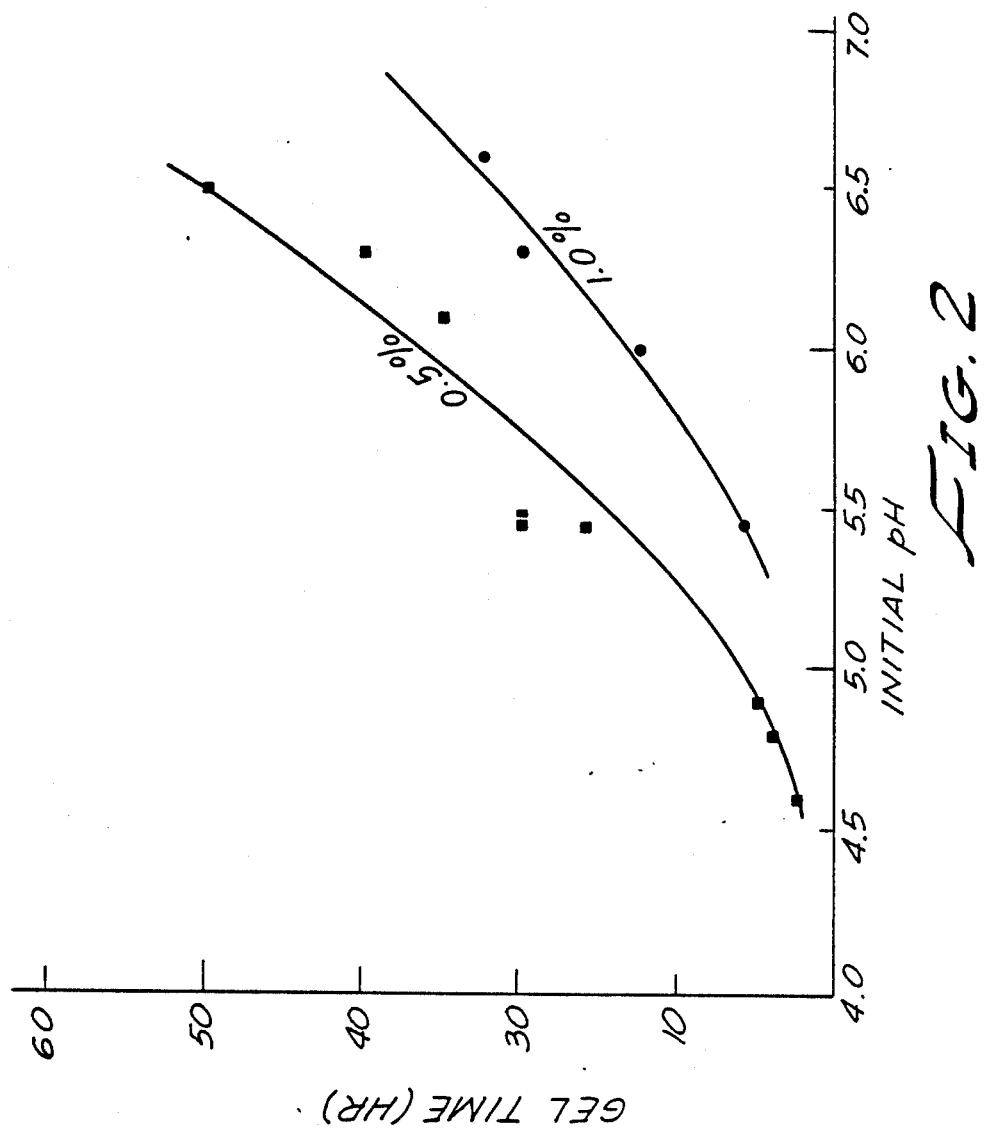
FIG. 2 is a graph of static gel times as a function of the initial pH of a gel-forming composition formulated with naturally buffered oil reservoir brine.

FIG. 2 is a graph of static gel times in vials as a function of the initial pH of the gel-forming composition wherein the composition is formulated using naturally buffered brine from a high clay content West Pico field. By the term "naturally buffered brine" as used herein is meant a brine which contains substantial amounts of buffering agents which resist changes in the pH thereof as well as the gel-forming composition formulated using such brine. An example of naturally buffered brine is the reservoir brine from the West Pico oil reservoir which requires relative large amounts of acid to lower its pH particularly by one, or two, or more points. The designations 0.5% and 1.0% on the curves represent initial glutaraldehyde concentrations of 0.5 and 1.0%.

The graph demonstrates that decreasing the initial pH of the brine used to formulate the gel-forming mixture will decrease the static gel time.

EXAMPLE NO. 7

Figure 3:
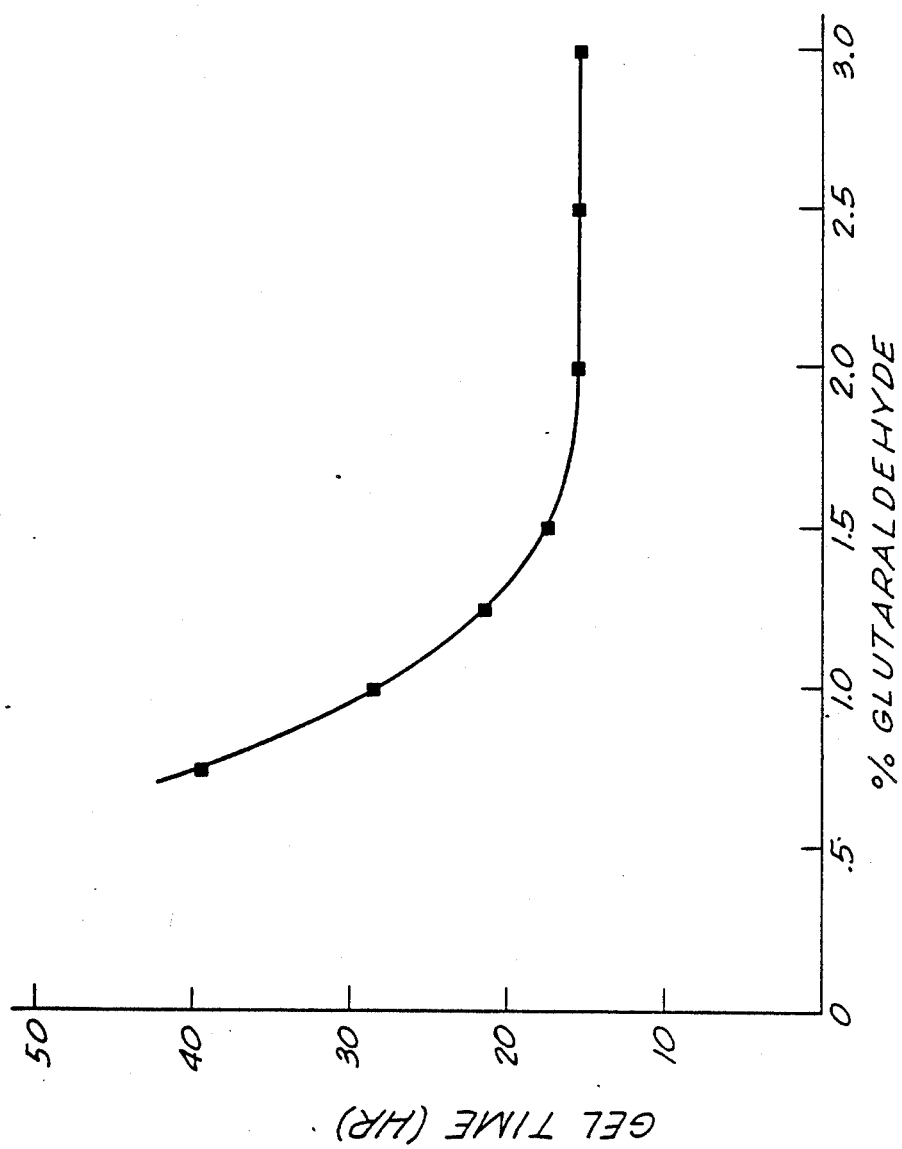
FIG. 3 is a graph of static gel times as a function of glutaraldehyde concentration in a gel-forming composition formulated with naturally buffered oil reservoir brine.

FIG. 3 is a graph of static gel times in vials as a function of glutaraldehyde concentration in the gel-forming composition which was prepared using a naturally buffered West Pico field brine that had been treated with hydrochloric acid to lower its pH to 6.0. The results when compared to FIG. 1 demonstrate that buffering action of West Pico brine increases the gel time.

EXAMPLE NO. 8

Figure 4:
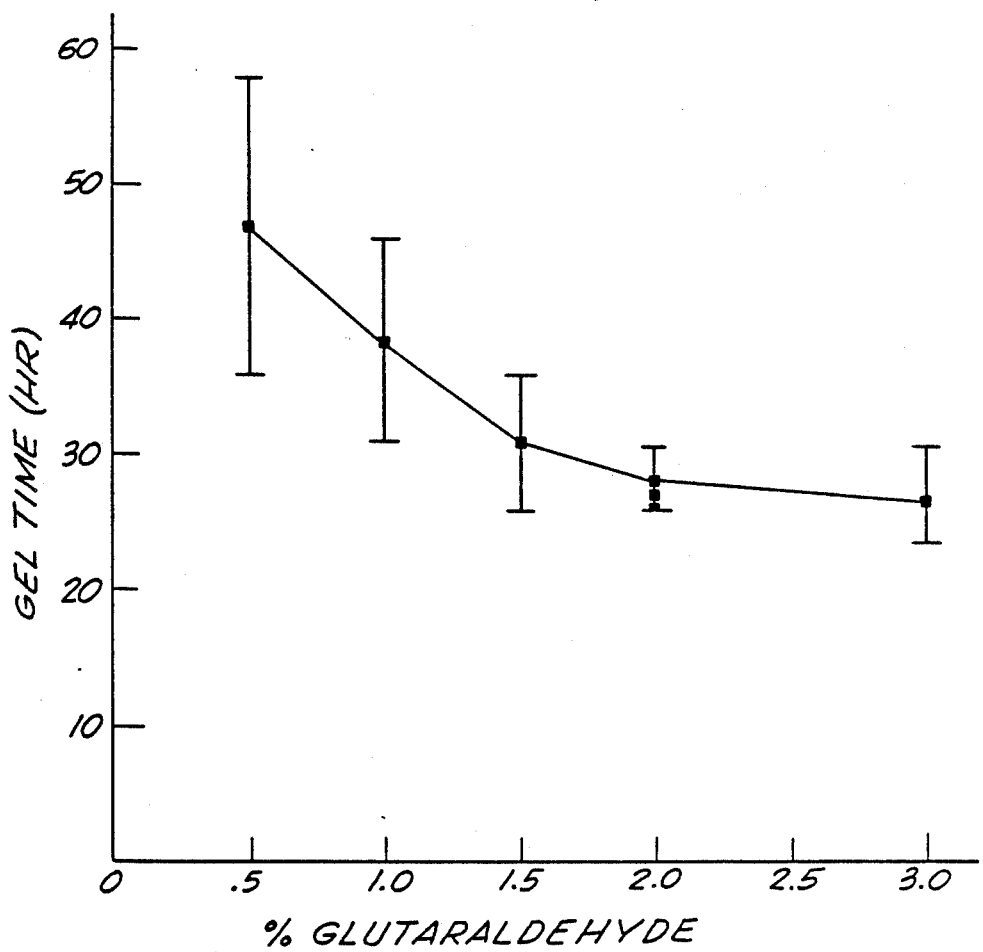
FIG. 4 is a graph of dynamic or flowing gel times as a function of glutaraldehyde concentration in a gel-forming composition formulated with naturally buffered oil reservoir brine.

FIG. 4 is a graph of dynamic gel times in sand packs as a function of glutaraldehyde concentration in the gel-forming composition which was prepared using a naturally buffered West Pico field brine that had been treated with hydrochloric acid to lower its pH to 6.0. The sand pack consisted of high clay content, alkaline, crushed West Pico rock. The elongated data points indicate the spread in data generally realized for flowing systems. The tests were conducted in a manner similar to that of Example No. 3. The results, when compared to FIG. 3, demonstrate that gel times in sand packs are usually longer than in vials.

The gel-forming compositions used in Examples 4 to 8 had a concentration of 2.5% polyvinyl alcohol having an average molecular weight of about 126,000, and were maintained at 93° C. during the tests.

EXAMPLE NO. 9

Figure 5:
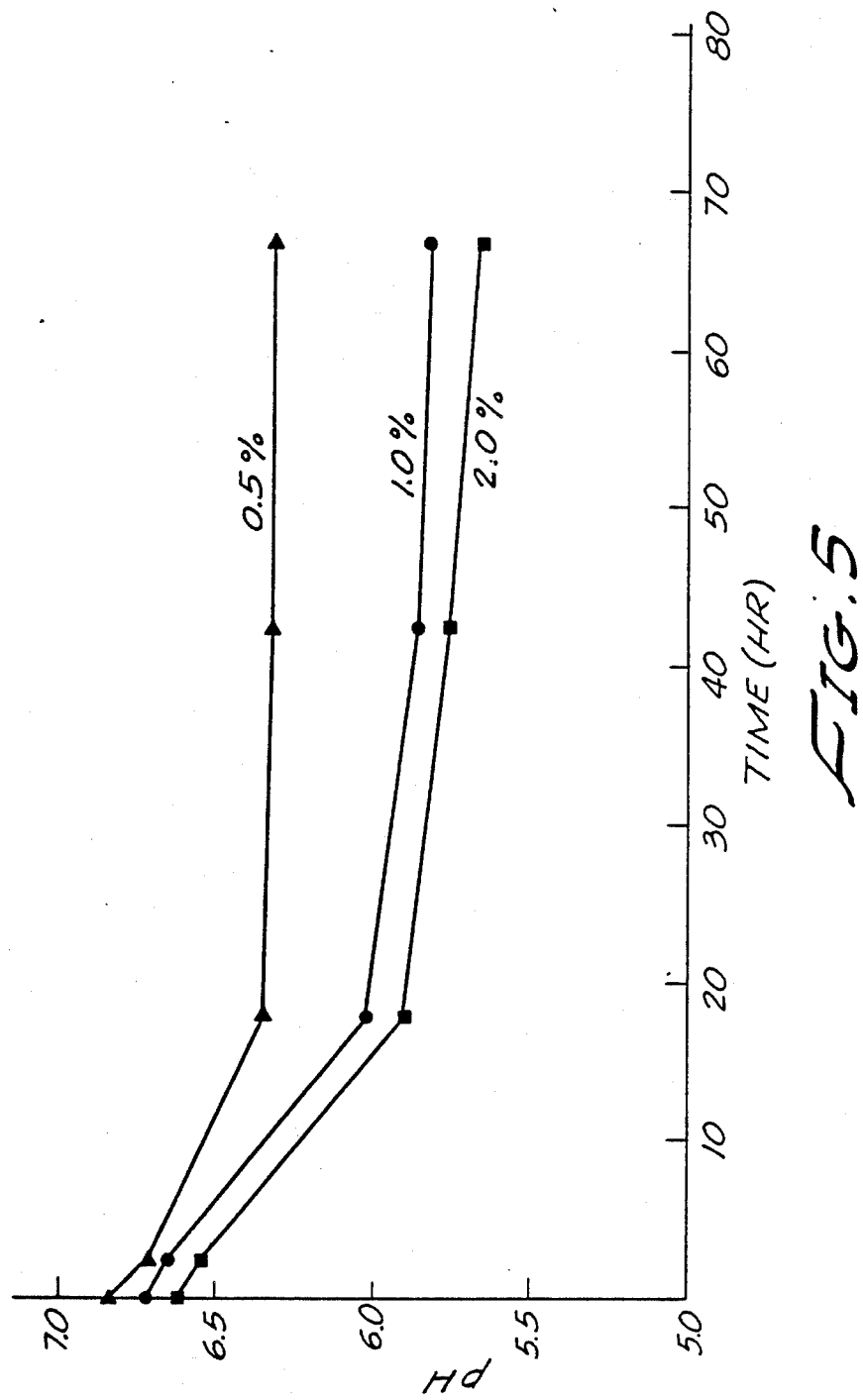
FIG. 5 is a graph of the pH of a naturally buffered oil reservoir brine containing certain concentrations of glutaraldehyde as a function of time.

FIG. 5 is a graph of the pH of a naturally buffered West Pico brine as a function of time for three initial glutaraldehyde concentrations. The naturally buffered brine was treated with hydrochloric acid to lower its pH to between 6.6 and 6.9 before the glutaraldehyde was added thereto. The data demonstrates that the pH of the brine gradually decreases with time. This phenomena is attributed to the decomposition of the glutaraldehyde in the brine to acidic products. The data indicates that the brine becomes weakly acidic with a pH from 5.5 to 6.5 depending on the initial glutaraldehyde concentration.

EXAMPLE NO. 10

A high clay content field having an average formation temperature of 90° C. and a reservoir injected water (RIW) or reservoir brine which is naturally buffered and has a pH of about 7.7 is being produced by waterflooding. A decision is made to treat the field by the process of this invention to improve the efficiency of the water sweep. Accordingly, 130 cubic meters of RIW is treated with 12% HCl aqueous solution to lower its pH to 6.0. To the treated RIW is added an amount of polyvinyl alcohol having an average molecular weight of about 126,000 to produce a 2.5% concentration therein. The brine-polymer mixture is heated in an in-line heater to 90° C. and stored in an insulated tank for at least 45 minutes to completely dissolve the polymer. Just before starting injection, an amount of a 50% glutaraldehyde aqueous solution (commercial grade) is added to the RIW-polymer mixture to produce a 2.0% concentration of glutaraldehyde thereby producing the gel-forming composition. The designed treatment calls for injecting all 130 cubic meters of the gel-forming composition into an injection well over a 10 hour period. In at least one nearby production well it is expected that upon resumption of waterflooding, that the water production will be reduced by about 30% and the oil production increased by at least about 30% approximately one month after the treatment as compared to production before treatment.

EXAMPLE NO. 11

An oil field having an average formation temperature of about 130° C. and a reservoir injected water (RIW) or reservoir brine having a pH of 6.3 is being produced by waterflooding. A decision is made to treat the field by the process of this invention. Accordingly, to 160 cubic meters of RIW is added an amount of polyvinyl alcohol having an average molecular weight of about 126,000 to produce a 2.5% concentration therein. The brine-polymer mixture is heated in an in-line heater to 90° C. and stored in an insulated tank for at least 45 minutes to completely dissolve the polymer. Just before injection, an amount of a 50% glutaraldehyde aqueous solution (commercial grade) is added to the RIW-polymer mixture to produce a 2.0% glutaraldehyde concentration thereby producing the gel-forming composition. The designed treatment calls for injecting all 160 cubic meters of the composition into an injection well over a 24 hour period. In at least one nearby production well it is expected that upon resumption of waterflooding, that the water production will be reduced by about 30% and the oil production increased by at least about 30% approximately one month after the treatment as compared to production before treatment.

Unless otherwise specified herein, all percents are weight percents.

The gels, the methods of forming the gels, and the processes for retarding the flow of fluids have some degree of flexibility. For example, if the environment in which the gels are to be used has a relatively high temperature, gel time can be slowed by using a smaller amount of glutaraldehyde. Similarly, if the environmental temperature is relatively low, gelation can be speeded by the use of larger amounts of glutaraldehyde. It is permissible to use the formation brine of the subterranean zone as the water part of the gel-forming composition since the gel will form even with hard water or saturated brine. Other variations of formulations, methods and processes will be apparent from this invention to those skilled in the art.

The foregoing disclosure and description of the present invention is illustrative and explanatory thereof and various changes in gel formation procedures and gel composition as well as the uses and applications of such gels to form them in situ in subterranean formations and to retard or block fluids in subterranean formations may be made within the scope of the appending claims without departing from the spirit of the invention. For example, many gel formulations can be produced and many methods of forming such gels in situ in subterranean formations will be apparent to one skilled in the art from this invention. For example, any number of sequential injection steps of the gel-forming compositions can be made. Furthermore, the necessary concentrations, amounts and sequence of injection of the gel-forming compositions can be tailored to suit the particular well or subterranean formation being treated.

What is claimed is:

1. A process for retarding the flow of fluid in a subterranean formation, comprising:
   (a) introducing an effective amount of a gel-forming composition into a subterranean formation, said gel-forming composition being operable when gelled in said formation for retarding the flow of fluid therein, said gel-forming composition comprising
      i. a first substance dissolved in water to form an aqueous solution, said first substance being selected from the group consisting of polyvinyl alcohols, and mixtures thereof, wherein said gel-forming composition contains an amount of said first substance of from about 0.5 to about 5 weight percent of said gel-forming composition, and
      ii. an effective amount of glutaraldehyde which is operable for forming a weakly acidic condition having a pH from about 5.5 to less than 7 in said gel-forming composition and also operable for promoting crosslinking of said first substance and glutaraldehyde and for forming a gel from said gel-forming composition under said weakly acidic condition within a period of time no greater than about 5 days without adding an acidic catalyst to said gel-forming composition to lower the pH of said gel-forming composition below about 5.5,
      wherein, other than glutaraldehyde and acidic products produced in said gel-forming composition from said glutaraldehyde, said gel-forming composition is substantially free of effective amounts of crosslinking catalyzing substances which are operable for promoting substantial acidic catalysis of a crosslinking reaction which is sufficient to form a gel within a period of time no greater than about 5 days, wherein said effective amount of glutaraldehyde is also from about 0.15 to about 4 weight percent of said gel-forming composition; and (b) allowing said gel-forming composition to form a gel in said subterranean formation within a period of time no greater than about 5 days without adding an acidic catalyst to said gel-forming composition to lower the pH of said gel-forming composition below about 5.5, said thusly formed gel being effective for retarding the flow of fluid therein.

2. The process of claim 1, wherein said subterranean formation has a reservoir brine having a pH higher than 7, and further comprising the steps of recovering a predetermined amount of said reservoir brine and adjusting the pH thereof to a value greater than 5.5 to less than 7 thereby forming an adjusted brine, and using said adjusted brine as said water in which said first substance is dissolved to form said aqueous solution mentioned in step (a).

3. The process of claim 1, wherein said effective amount of glutaraldehyde is also at least about 0.2 weight percent of said gel-forming composition.

4. The process of claim 1, wherein said effective amount of glutaraldehyde is also from about 0.2 to about 2 weight percent of said gel-forming composition, and wherein said gel-forming composition is at least about 93 weight percent water.

5. The process of claim 1, wherein said effective amount of glutaraldehyde is also from about 0.5 to about 2 weight percent of said gel-forming composition.

6. The process of claim 1, wherein said effective amount of glutaraldehyde is also more than about 8% of the stoichiometric amount required to react with all of the crosslinkable sites of said first substance.

7. The process of claim 1, wherein said effective amount of said glutaraldehyde is also sufficient to maintain said gel-forming composition acidic and at a pH of from about 6 to less than 7.

8. The process of claim 1, further comprising preventing the introduction into said subterranean formation of an effective amount of a crosslinking catalyzing substance which is not glutaraldehyde under conditions which are operable for causing substantial contacting of said crosslinking catalyzing substance with said gel-forming composition sufficient to lower the pH of said gelforming composition in said subterranean formation below that of said weakly acidic condition, wherein said effective amount of crosslinking catalyzing substance is operable for promoting substantial acidic catalysis of a crosslinking reaction in said subterranean formation of said gel-forming composition.

9. The process of claim 1, wherein said subterranean formation comprises a substantial amount of basic material which when contacting said gel-forming composition will increase the pH thereof, and wherein said effective amount of glutaraldehyde in said gel-forming composition is also sufficient to maintain the acidity of said gel-forming composition, after its introduction into said subterranean formation, at a pH of from about 5.5 to less than 7.

10. The process of claim 1, wherein said effective amount of said glutaraldehyde is also operable for causing said gel-forming composition to gel in said subterranean formation in a period of time from about one half to about three days after introducing said gel-forming composition into said subterranean formation.

11. The process of claim 1, wherein said gel-forming composition has a pH from 6.0 to about 6.8.

12. The process of claim 1, wherein said effective amount of said glutaraldehyde is also operable for causing said gel-forming composition to gel in said subterranean formation in a period of time from about one to about two days after introducing said gel-forming composition into said subterranean formation.

13. A process for recovering oil from a subterranean formation and retarding the flow of fluid in nonproductive flow channels in said subterranean formation, comprising:

(a) introducing an effective amount of a gel-forming composition into nonproductive flow channels of an oil bearing subterranean formation, said gel-forming composition being operable when gelled in said formation for retarding the flow of fluid in said channels, said gel-forming composition comprising i. a first substance dissolved in water to form an aqueous solution, said first substance being selected from the group consisting of polyvinyl alcohols, and mixtures thereof, wherein said gel-forming composition contains an amount of said first substance of from about 1.5 to about 5 weight percent of said gel-forming composition, said first substance having an average molecular weight from about 30,000 to about 1,000,000, and ii. an effective amount of glutaraldehyde which is operable for forming a weakly acidic condition having a pH from about 5.5 to less than 7 in said gel-forming composition and also operable for promoting crosslinking of said first substance and glutaraldehyde and for forming a gel from said gel-forming composition when said gel-forming composition has a pH from about 5.5 to less than 7 within a period of time no greater than about 4 days without adding an acidic catalyst to said gel-forming composition to lower the pH of said gel-forming composition below about 5.5.

wherein, other than glutaraldehyde and acidic products produced in said gel-forming composition from said glutaraldehyde, said gel-forming composition is substantially free of effective amounts of crosslinking catalyzing substances which are operable for promoting substantial acidic catalysis of a crosslinking reaction which is sufficient to form a gel within a period of time no greater than about 4 days, wherein said effective amount of glutaraldehyde is also from about 0.2 to about 4 weight percent of said gel-forming composition, and wherein said gel-forming composition is at least about 91 weight percent water;

(b) allowing said gel-forming composition to form a gel in said non-productive flow channels of said subterranean formation within a period of time no greater than about 4 days without adding an acidic catalyst to said gel-forming composition to lower the pH of said gel-forming composition below about 5.5, said thusly formed gel being effective for retarding the flow of fluid therein; and (c) after said gel is formed in said flow channels of said subterranean, recovering oil from said formation.

14. The process of claim 13, wherein said recovering oil from said formation comprises waterflooding.

15. A process for recovering oil from a subterranean formation and retarding the flow of fluid in nonproductive flow channels in said subterranean formation, comprising:
  (a) introducing an effective amount of a gel-forming composition into nonproductive flow channels of an oil bearing subterranean formation, said gel-forming composition being operable when gelled in said formation for retarding the flow of fluid in said channels, said gel-forming composition comprising
    i. polyvinyl alcohol dissolved in water to form an aqueous solution, wherein said gel-forming composition contains an amount of said polyvinyl alcohol of from about 1.5 to about 4 weight percent of said gel-forming composition, said polyvinyl alcohol having an average molecular weight from about 30,000 to about 1,000,000, and
    ii. an effective amount of glutaraldehyde which is operable for forming a weakly acidic condition having a pH from about 6 to about 6.9 in said gel-forming composition and also operable for promoting crosslinking of said polyvinyl alcohol and glutaraldehyde and for forming a gel from said gel-forming composition when said gel-forming composition has a pH from about 6 to about 6.9 within a period of time of from about $\frac{1}{2}$ to about 4 days, without adding an acidic catalyst to said gel-forming composition to lower the pH of said gel-forming composition below about 5.5,
    wherein, other than glutaraldehyde and acidic products produced in said gel-forming composition from said glutaraldehyde, said gel-forming composition is substantially free of effective amounts of crosslinking catalyzing substances which are operable for promoting substantial acidic catalysis of a crosslinking reaction which is sufficient to form a gel within a period of time of from about $\frac{1}{2}$ to about 4 days,
    wherein said effective amount of glutaraldehyde is also from about 0.5 to about 4 weight percent of said gel-forming composition,
  and
    wherein said gel-forming composition is at least about 91 weight percent water;
  (b) allowing said gel-forming composition to form a gel in said nonproductive flow channels of said subterranean formation within a period of time of from about $\frac{1}{2}$ to about 4 days, without adding an acidic catalyst to said gel-forming composition to lower the pH of said gel-forming composition below about 5.5, and thusly formed gel being effective for retarding the flow of fluid therein; and
  (c) after said gel is formed in said flow channels of said subterranean, recovering oil from said formation.

16. The process of claim 15, wherein said nonproductive flow channels of said subterranean formation comprise a substantial amount of basic materials such that, when said gel-forming composition comes into contact with said basic materials, the pH of said gel-forming composition will be increased to a value of 7 or more, and further comprising contacting said nonproductive flow channels of said subterranean formation with an effective amount of an acidic substance sufficient to neutralize said basic materials to an extent that when said gel-forming composition is introduced into said subterranean formation said basic materials will not be capable of increasing the pH of said gel-forming composition to 7 or higher before said gel-forming composition forms a gel in said subterranean formation.

17. The process of claim 15, wherein said subterranean formation has a reservoir brine having a pH higher than 7, and further comprising the steps of recovering a predetermined amount of said reservoir brine and adjusting the pH thereof to a value from about 6 to less than 7 thereby forming an adjusted brine, and using said adjusted brine as said water in which said polyvinyl alcohol is dissolved to form said aqueous solution mentioned in step (a).

18. The process of claim 15, wherein said average molecular weight of said polyvinyl alcohol is from about 100,000 to about 1,000,000.

19. A process for recovering oil from a subterranean formation and retarding the flow of fluid in nonproductive flow channels in said subterranean formation, comprising:
  (a) recovering an amount of brine from a subterranean formation;
  (b) adjusting the pH of said recovered amount of brine to a value between about 6 and about 6.9 thereby forming an adjusted brine;
  (c) introducing an effective amount of a gel-forming composition into nonproductive flow channels of an oil bearing subterranean formation, said gel-forming composition being operable when gelled in said formation for retarding the flow of fluid in said channels, said gel-forming composition comprising
    i. polyvinyl alcohol dissolved in said adjusted brine to form an aqueous solution, wherein said gel-forming composition contains an amount of said polyvinyl alcohol of from about 1.5 to about 4 weight percent of said gel-forming composition, said polyvinyl alcohol having an average molecular weight from about 30,000 to about 1,000,000, and
    ii. an effective amount of glutaraldehyde which is operable for forming a weakly acidic condition having a pH from about 6 to about 6.9 in said gel-forming composition and also operable for promoting crosslinking of said polyvinyl alcohol and glutaraldehyde and for forming a gel from said gel-forming composition when said gel-forming composition has a pH from about 6 to about 6.9 within a period of time of from about $\frac{1}{2}$ to about 4 days without adding an acidic catalyst to said gel-forming composition to lower the pH of said gel-forming composition below 5.5,
    wherein, other than commercial grade glutaraldehyde and acidic products produced in said gel-forming composition from said glutaraldehyde, said gel-forming composition is substantially free of effective amounts of crosslinking catalyzing substances which are operable for promoting substantial acidic catalysis of a crosslinking reaction which is sufficient to form a gel within a period of time of from about $\frac{1}{2}$ to about 4 days,
    wherein said effective amount of glutaraldehyde provided by said commercial grade glutaraldehyde is from about 0.5 to about 4 weight percent of said gel-forming composition, and wherein said gel-forming composition is at least about 91 weight percent water;

(d) allowing said gel-forming composition to form a gel in said non-productive flow channels of said subterranean formation within a period of time of from about ½ to about 4 days without adding an acidic catalyst to said gel-forming composition to lower the pH of said gel-forming composition below 5.5, said thusly formed gel being effective for retarding the flow of fluid therein; and (e) after said gel is formed in said flow channels of said subterranean, recovering oil from said formation.

20. The process of claim 19, wherein said average molecular weight of said polyvinyl alcohol is from about 100,000 to about 1,000,000.

21. The process of claim 19, wherein said glutaraldehyde is commercial grade glutaraldehyde.

22. A process for recovering oil from a subterranean formation and retarding the flow of fluid in nonproductive flow channels in said subterranean formation, wherein said nonproductive flow channels comprise a substantial amount of basic material which tends to increase the pH of substances introduced into said flow channels, comprising:

(a) introducing an effective amount of a gel-forming composition into nonproductive flow channels of an oil bearing subterranean formation, said gel-forming composition being operable when gelled in said formation for retarding the flow of fluid in said channels, said gel-forming composition comprising i. polyvinyl alcohol dissolved in water to form an aqueous solution, wherein said gel-forming composition contains an amount of said polyvinyl alcohol of from about 1.5 to about 4 weight percent of said gel-forming composition, said polyvinyl alcohol having an average molecular weight from about 30,000 to about 1,000,000, and ii. an effective amount of glutaraldehyde which is operable for forming a weakly acidic condition having a pH from about 6 to about 6.9 in said gel-forming composition and also operable for promoting crosslinking of said polyvinyl alcohol and glutaraldehyde and for forming a gel from said gel-forming composition when said gel-forming composition has a p from about 6 to about 6.9 within a period of time of from about ½ to about 4 days, and for maintaining said weakly acidic condition of said gel-forming composition after its introduction into said flow channels without adding an acidic catalyst to said gel-forming composition to lower the pH of said gel-forming composition below about 5.5, wherein, other than glutaraldehyde and acidic products produced in said gel-forming composition from said glutaraldehyde, said gel-forming composition is substantially free of effective amounts of crosslinking catalyzing substances which are operable for promoting substantial acidic catalysis of a crosslinking reaction which is sufficient to form a gel within a period of time of from about ½ to about 4 days, wherein said effective amount of glutaraldehyde is also from about 0.5 to about 4 weight percent of said gel-forming composition, and wherein said gel-forming composition is at least about 91 weight percent water;

(b) allowing said gel-forming composition to form a gel in said nonproductive flow channels of said subterranean formation within a period of time of from about ½ to about 4 days without adding an acidic catalyst to said gel-forming composition to lower the pH of said gel-forming composition below about 5.5, said thusly formed gel being effective for retarding the flow of fluid therein; and (c) after said gel is formed in said flow channels of said subterranean, recovering oil from said formation.

23. The process of claim 22, wherein said average molecular weight of said polyvinyl alcohol is from about 100,000 to about 1,000,000.

24. A process for retarding the flow of fluid in a subterranean formation comprising:

(a) introducing an effective amount of a gel-forming composition into a subterranean formation, said gel-forming composition being operable when gelled in said formation for retarding the flow of fluid therein, said gel-forming composition comprising i. a first substance dissolved in water to form an aqueous solution, said first substance being selected from the group consisting of polyvinyl alcohol copolymers, and mixtures thereof, wherein said gel-forming composition contains an amount of said first substance of from about 0.5 to about 5 weight percent of said gel-forming composition, and ii. an effective amount of glutaraldehyde which is operable for forming a weakly acidic condition having a pH from about 5.5 to less than 7 in said gel-forming composition and also operable for promoting crosslinking of said first substance and glutaraldehyde and for forming a gel from said gel-forming composition under said weakly acidic condition within a period of time no greater than about 5 days without adding an acidic catalyst to said gel-forming composition to lower the pH of said gel-forming composition below about 5.5, wherein, other than glutaraldehyde and acidic products produced in said gel-forming composition from said glutaraldehyde, said gel-forming composition is substantially free of effective amounts of crosslinking catalyzing substances which are operable for promoting substantial acidic catalysis of a crosslinking reaction which is sufficient to form a gel within a period of time no greater than about 5 days, wherein said effective amount of glutaraldehyde is also from about 0.15 to about 4 weight percent of said gel-forming composition; and (b) allowing said gel-forming composition to form a gel in said subterranean formation within a period of time no greater than about 5 days without adding an acidic catalyst to said gel-forming composition to lower the pH of said gel-forming composition below about 5.5, said thusly formed gel being effective for retarding the flow of fluid in said subterranean formation.

25. The process of claim 24, wherein said subterranean formation has a reservoir brine having a pH higher than 7, and further comprising the steps of recovering a predetermined amount of said reservoir brine and adjusting the pH thereof to a value greater than 5.5 but less than 7 thereby forming an adjusted brine, and using said adjusted brine as said water in which said first substance is dissolved to form said aqueous solution mentioned in step (a).

26. The process of claim 24, wherein said effective amount of glutaraldehyde is also at least about 0.2 weight percent of said gel-forming composition.

27. The process of claim 24, wherein said effective amount of glutaraldehyde is also from about 0.2 to about 2 weight percent of said gel-forming composition, and wherein said gel-forming composition is at least about 93 weight percent water.

28. The process of claim 24, wherein said effective amount of glutaraldehyde is also from about 0.5 to about 2 weight percent of said gel-forming composition.

29. The process of claim 24, wherein said effective amount of glutaraldehyde is also more than about 8% of the stoichiometric amount required to react with all of the crosslinkable sites of said first substance.

30. The process of claim 24, wherein said effective amount of said glutaraldehyde is also sufficient to maintain said gel-forming composition acidic and at a pH of from about 6 to less than 7.

31. The process of claim 24, further comprising preventing the introduction into said subterranean formation of an effective amount of a crosslinking catalyzing substance which is not glutaraldehyde under conditions which are operable for causing substantial contacting of said crosslinking catalyzing substance with said gel-forming composition sufficient to lower the pH of said gel-forming composition in said subterranean formation below that of said weakly acidic condition, wherein said effective amount of crosslinking catalyzing substance is operable for promoting substantial acidic catalysis of a crosslinking reaction in said subterranean formation of said gel-forming composition.

32. The process of claim 24, wherein said subterranean formation comprises a sufficient amount of basic material which when contacting said gel-forming composition will increase the pH thereof, and wherein said effective amount of glutaraldehyde in said gel-forming composition is also sufficient to maintain the acidity of said gel-forming composition, after its introduction into said subterranean formation, at a pH of from about 5.5 to less than 7.

33. The process of claim 24, wherein said effective amount of said glutaraldehyde is also operable for causing said gel-forming composition to gel in said subterranean formation in a period of time of from about one half to about three days after introducing said gel-forming composition into said subterranean formation.

34. the process of claim 24, wherein said gel-forming composition has a pH of from 6.0 to about 6.8.

35. The process of claim 24, wherein said effective amount of said glutaraldehyde is also operable for causing said gel-forming composition to gel in said subterranean formation in a period of time of from about one to about two days after introducing said gel-forming composition into said subterranean formation.

36. A process for recovering oil from a subterranean formation and retarding the flow of fluid in nonproductive flow channels in said subterranean formation, comprising:
(a) introducing an effective amount of a gel-forming composition into nonproductive flow channels of an oil bearing subterranean formation, said gel-forming composition being operable when gelled in said formation for retarding the flow of fluid in said channels, said gel-forming composition comprising
i. a first substance dissolved in water to form an aqueous solution, said first substance being selected from the group consisting of polyvinyl alcohol copolymers, and mixtures thereof, wherein said gel-forming composition contains an amount of said first substance of from about 1.5 to about 5 weight percent of said gel-forming composition, said first substance having an average molecular weight from about 30,000 to about 1,000,000,
and
ii. an effective amount of glutaraldehyde which is operable for forming a weakly acidic condition having a pH from about 5.5 to less than 7 in said gel-forming composition and also operable for promoting crosslinking of said first substance and glutaraldehyde and for forming a gel from said gel-forming composition when said gel-forming composition has a pH from about 5.5 to less than 7 within a period of time no greater than about 4 days without adding an acidic catalyst to said gel-forming composition to lower the pH of said gel-forming composition below about 5.5,
wherein, other than glutaraldehyde and acidic products produced in said gel-forming composition from said glutaraldehyde, said gel-forming composition is substantially free of effective amounts of crosslinking catalyzing substances which are operable for promoting substantial acidic catalysis of a crosslinking reaction which is sufficient to form a gel within a period of time no greater than about 4 days,
wherein, said effective amount of glutaraldehyde is also from about 0.2 to about 4 weight percent of said gel-forming composition, and
wherein, said gel-forming composition is at least about 91 weight percent water;
(b) allowing said gel-forming composition to form a gel in said nonproductive flow channels of said subterranean formation within a period of time no greater than about 4 days without adding an acidic catalyst to said gel-forming composition to lower the pH of said gel-forming composition below about 5.5, said thusly formed gel being effective for retarding the flow of fluid in said subterranean formation; and
(c) after said gel is formed in said flow channels of said subterranean formation, recovering oil from said formation.

37. The process of claim 36, wherein said recovery oil from said formation comprises waterflooding.

* * * * *